(12) United States Patent
Ma et al.

(10) Patent No.: US 8,547,846 B1
(45) Date of Patent: Oct. 1, 2013

(54) METHOD AND APPARATUS PROVIDING PRECEDENCE DROP QUALITY OF SERVICE (PDQOS) WITH CLASS-BASED LATENCY DIFFERENTIATION

(75) Inventors: Laura Jane Poplawski Ma, Somerville, MA (US); Frank Kastenholtz, Medford, MA (US); Gregory Stephen Lauer, Sudbury, MA (US); Walter Clark Milliken, Dover, NH (US); Gregory Donald Troxel, Stow, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 136 days.

(21) Appl. No.: 13/209,646

(22) Filed: Aug. 15, 2011

Related U.S. Application Data

(63) Continuation-in-part of application No. 12/200,264, filed on Aug. 28, 2008, now Pat. No. 8,203,956.

(51) Int. Cl.
*H04L 1/00* (2006.01)
(52) U.S. Cl.
USPC ............ 370/235; 370/413; 370/415; 370/417

(58) Field of Classification Search
USPC .................. 370/235, 237, 252, 253, 412–418, 370/444
See application file for complete search history.

(56) References Cited

U.S. PATENT DOCUMENTS

| | | | |
|---|---|---|---|
| 2010/0005178 A1* | 1/2010 | Sindelaru et al. | 709/228 |
| 2011/0292805 A1* | 12/2011 | Mitsuhashi | 370/237 |
| 2012/0275464 A1* | 11/2012 | Voruganti et al. | 370/412 |
| 2012/0327778 A1* | 12/2012 | Stanwood et al. | 370/237 |

* cited by examiner

Primary Examiner — Alvin Zhu
(74) Attorney, Agent, or Firm — Chapin IP Law, LLC

(57) ABSTRACT

A packet is classified into a class. A priority value is assigned to the packet wherein packets in a flow are assigned priorities according to some probability distribution within some band. A determination is made, at a network device for a highest latency class, whether a sum of queued packet sizes of previously received packets having an equal or smaller latency class than the packet and larger or equal priority than the packet is larger than a threshold value. When the sum is larger, the packet is dropped, otherwise a determination is made whether a latency class of the packet is less than the latency class of the network device. When the latency class is not less, the packet is stored in a queue for the latency class. When the latency class is less, then the process is repeated until the packet is dropped or stored in a queue.

21 Claims, 15 Drawing Sheets

METHOD AND APPARATUS PROVIDING PRECEDENCE DROP QUALITY OF SERVICE (PDQOS) WITH CLASS-BASED LATENCY DIFFERENTIATION

CROSS-REFERENCE TO RELATED APPLICATIONS

This application is a continuation-in-part of U.S. application Ser. No. 12/200,264, filed Aug. 28, 2008 now U.S. Pat. No. 8,203,956.

GOVERNMENT RIGHTS

This invention was made with government support under Contract Number N66001-09-C-2073 awarded by DARPA. The government has certain rights in this invention.

BACKGROUND

A typical data communications network includes multiple host computers that are linked together by a combination of data communications devices and transmission media. In general, the host computers communicate by packaging data using a standardized protocol or format such as a network packet or cell (hereinafter generally referred to as a packet), and exchanging the packaged data through the data communications devices and transmission media.

In the field of computer networking and other packet-switched telecommunication networks, the traffic engineering term quality of service (QoS) refers to control mechanisms for achieving a desired service quality. Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications such as Voice over IP (VoIP) and IP-TV, since these often require fixed bit rate and are delay sensitive, and in networks where the capacity is a limited resource, for example in cellular data communication.

For example, a distinction may be drawn between packets carrying video data (i.e., video packets belonging to a video QoS class) and packets carrying general data (i.e., general data packets belonging to a general data QoS class such as Best Effort Service). In this arrangement, a data communications device processes video packets through a network differently than general data packets due to different link resource availability and resources being allocated differently based on the QoS class of the packets.

There are different types of QoS routing techniques. In one QoS routing technique (hereinafter called QoS class-prioritized routing), a data communications device internally prioritizes the processing of different QoS class packets in accordance with a pre-established QoS policy. For example, in accordance with one such QoS policy, a data communications device gives higher priority to video packets relative to general data packets. Accordingly, if the data communications device simultaneously receives a video packet and a general data packet (e.g., through multiple input ports), the QoS policy directs the device to process the video packet before the general data packet. As a result, in QoS class-prioritized routing, packet destinations (i.e., receiving host computers) generally perceive different responses, or Qualities of Service, for different QoS classes (e.g., faster video transmissions than general data transmissions).

In another QoS routing technique (hereinafter called load-directed routing), the data communications device generally directs packets through the network based on network load conditions. For example, suppose that the data communications device has multiple output ports to data paths that eventually lead to the same remote destination (i.e., the same receiving host computer). When the data communications device receives a video packet destined for that remote destination, the device transmits the video packet out the output port expected to lead to a low traffic area of the network. On the other hand, when the device receives a general data packet destined for the same remote destination, the device transmits the general data packet out a different output port expected to lead to a high traffic area of the network. With this arrangement, the video packet should travel through the network faster than the general data packet. Accordingly, the load-directed routing technique generally provides the same result as the QoS class-prioritized routing technique. That is, packet destinations (i.e., receiving host computers) generally perceive different Quality of Service or responses for different QoS classes (e.g., quicker video transmissions than general data transmissions).

A network or protocol that supports QoS may agree on a traffic contract with the application software and reserve capacity in the network nodes, for example during a session establishment phase. During the session it may monitor the achieved level of performance, for example the data rate and delay, and dynamically control scheduling priorities in the network nodes. It may release the reserved capacity during a tear down phase.

A best-effort network or service does not support quality of service. An alternative to complex QoS control mechanisms is to provide high quality communication over a best-effort network by over-provisioning the capacity so that it is sufficient for the expected peak traffic load.

Another processing technique involves splitting traffic among multiple output queues which are then scheduled in some fashion (often using an algorithm called Weighted Fair Queuing (WFQ), which provides a specified minimum fraction of the link bandwidth to each queue feeding the link). Diffserv services (described below) often uses WFQ between traffic classes, with each class having its own queue.

Random early detection (RED), also known as random early discard or random early drop is an active queue management technique. It is also a congestion avoidance algorithm. In the traditional tail drop algorithm, a router or other network component buffers as many packets as it can, and simply drops the ones it cannot buffer. If buffers are constantly full, the network is congested. Tail drop distributes buffer space unfairly among traffic flows. Tail drop can also lead to Transmission Control Protocol (TCP) global synchronization as all TCP connections "hold back" simultaneously, and then step forward simultaneously. Networks become under-utilized and flooded by turns. RED addresses these issues by monitoring the average queue size and drops (or marks when used in conjunction with ECN) packets based on statistical probabilities. If the buffer is almost empty, all incoming packets are accepted. As the queue grows, the probability for dropping an incoming packet grows too. As the queue becomes full, drops become very likely, preventing the buffer from overflowing. RED is considered more fair than tail drop. The more a host transmits, the more likely it is that its packets are dropped. Early detection helps avoid global synchronization.

Per-flow QoS is also known as "intserv", for the IETF working group that defined it. It typically used WFQ with a single queue for each end-user traffic flow (e.g. a single TCP connection, or all traffic between a specific pair of sites).

Another type of management technique is knows as Differentiated Services (diffserv). In diffserv, users pay for the desired bandwidth speed and allotment (collectively referred to as a service level agreement (SLA)) for a packet flow. A flow is marked at every router, the marking indicating the level of service the packet flow is receiving. For example, a green marking indicates that the packet flow is within the SLA, a yellow marking indicates that the flow is slightly over the paid for SLA (but not by a large amount), a red indicator means the packet flow is over its SLA. A flow may transition between different markings as it traverses a network. Yet another type of management technique is known as Multi-Level Priority Marking (MLPM). In MLPM the IP Precedence field of a packet is used to encode the value of packets in an encoded video stream, so that the least valuable packets are dropped first.

SUMMARY

Conventional mechanisms such as those explained above suffer from a variety of deficiencies. One such deficiency is that conventional QoS implementations, for example Per-flow QoS, requires complex router state and signaling as well as a large number of queues which result in high equipment costs to implement and maintain. Per-flow QoS also requires high management complexity which also is costly, and as such Internet Service Providers (ISPs) typically do not use it. For traffic class QoS (e.g., diffserv), the cost and management is much simpler since there is no signaling and relatively few queues, but it really is just a more expensive best-effort service, therefore users tend not to purchase it since they are not guaranteed the performance they desire. In MLPM, because the precedence levels were assigned to different queues in the routers, the packets would arrive wildly out-of-order. Reordering the packets into their correct order is difficult and expensive, and become even more so at higher speeds.

In existing QoS enforcement, packet ordering may be changed to favor "important" flows or to rate-shape flows or classes, as well as to keep links busy if any traffic is available. The ordering method may be by priority or weighted fair queuing. As stated earlier, reordering the packets into their correct order is difficult and expensive, and become even more so at higher speeds. Packets are dropped if queues back up too far or if Random Early Discard (RED) triggers (to rate control TCP without synchronized misbehavior).

Embodiments of the invention significantly overcome such deficiencies and provide mechanisms and techniques that provide precedence drop quality of service (PDQoS) methodology. The precedence drop QoS methodology is simple to configure and manage, offers several advantages to end uses, and is straightforward to implement.

The precedence drop QoS methodology assigns a precedence drop value to each packet and packets are dropped if a sum of queued packet sizes of all packets having a same or higher drop precedence value than the newly received packet is larger than a threshold value. This provides user control over congestion and removes the need for packet re-ordering for QoS enforcement. Thus QoS enforcement can be done entirely in a simple packet-drop decision, without employing multiple output queues and a complex multi-queue scheduler. Precedence-based dropping can also replace RED, and is of similar (low) complexity. (In actual fact, it's easier, because RED normally require doing integer division for every packet, PDQoS only needs to do much simpler adds and subtracts. However, it does need a small state table, which RED implementations don't require.) Different packets in same flow may have radically different drop precedences (i.e. value to user).

In a particular embodiment of a method for providing drop precedence quality of service, the method includes determining a drop precedence value for a packet and inserting the drop precedence value into the packet. The method further includes transmitting the packet having the drop precedence value inserted therein. Typically this is accomplished at a grooming router or by the originating host.

In another embodiment of a method of providing drop precedence quality of service, the method includes receiving a plurality of packets, at least one packet of the plurality of packets having a drop precedence value associated therewith. The method further includes determining for a newly received packet whether a sum of queued packet sizes of all packets having a same or higher drop precedence value than the newly received packet is larger than a threshold value. The method additionally includes dropping the newly received packet when the sum of queued packet sizes of all packets having a same or higher drop precedence value than the newly received packet is larger than the threshold value.

Other embodiments include a computer readable medium having computer readable code thereon for providing drop precedence quality of service. The computer readable medium includes instructions for determining a drop precedence value for a packet and instructions for inserting the drop precedence value into the packet. The computer readable medium further includes instructions for transmitting the packet having the drop precedence value inserted therein.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a drop precedence quality of service methodology as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

In another embodiment, a method for providing drop precedence quality of service with class-based differentiation is provided. The method includes classifying a packet into a class based on a traffic type associated with the packet. The method further includes assigning a priority value to the packet wherein packets in a flow are assigned priorities according to some probability distribution within some band. Additionally, the method includes determining, at a network device for a highest latency class, whether a sum of queued packet sizes of previously received packets having an equal or smaller latency class than the packet and larger or equal priority than the packet is larger than a threshold value for the latency class associated with the network device, and when sum of queued packet sizes of previously received packets having an equal or smaller latency class than the packet and larger or equal priority than the packet is larger than the threshold value, then dropping the packet, otherwise determining whether a latency class of the packet is less than the latency class of the network device and when the latency class of the packet is not less than the latency class of the network device then storing the packet in a queue for the latency class, and when the latency class of the packet is less than the latency class of the network device then repeating the determining for a next lower latency class until the packet is dropped or stored in a queue.

In another embodiment, a computer readable medium having computer readable code thereon for providing drop precedence quality of service with class-based differentiation includes instructions for classifying a packet into a class based on a traffic type associated with the packet. The compute readable medium also includes instructions for assigning a priority value to the packet. Further, the compute readable medium includes instructions for determining, at a network device for a highest latency class, whether a sum of queued packet sizes of previously received packets having an equal or smaller latency class than the packet and larger or equal priority than the packet is larger than a threshold value for the latency class associated with the network device, and when sum of queued packet sizes of previously received packets having an equal or smaller latency class than the packet and larger or equal priority than the packet is larger than the threshold value, then dropping the packet, otherwise determining whether a latency class of the packet is less than the latency class of the network device and when the latency class of the packet is not less than the latency class of the network device then storing the packet in a queue for the latency class, and when the latency class of the packet is less than the latency class of the network device then repeating the determining for a next lower latency class until the packet is dropped or stored in a queue.

Another embodiment pairs what is described in the previous paragraphs with (in addition) packet transmission prioritized such that: (a) there is a maximum transmission rate for each latency class that covers all transmitted packets at or below that latency class, (b) a packet is always transmitted from the lowest latency queue that does not break the maximum transmission rate for that and all lower latencies.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a drop precedence quality of service methodology as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method and apparatus are described for providing drop precedence quality of service (PDQoS). A grooming router, source host computer or application is used wherein a drop precedence value for a packet is determined and inserted into the packet. The packet having the drop precedence value inserted therein is then transmitted. A router receives a plurality of packets, at least one packet of the plurality of packets having a drop precedence value associated therewith. The router then determines for a newly received packet having a drop precedence value associated therewith whether a sum of queued packet sizes of all packets having a same or higher drop precedence value than the newly received packet is larger than a threshold value. The router will drop the newly received packet when the sum of queued packet sizes of all packets having a same or higher drop precedence value than the newly received packet is larger than the threshold value, or forward the packet when the sum of queued packet sizes of all packets having a same or higher drop precedence value than the newly received packet are not larger than the threshold value. Only packet drop behavior is used to provide a QoS type effect, as well as providing user control over congestion and eliminating the need for packet re-ordering.

Figure 1:
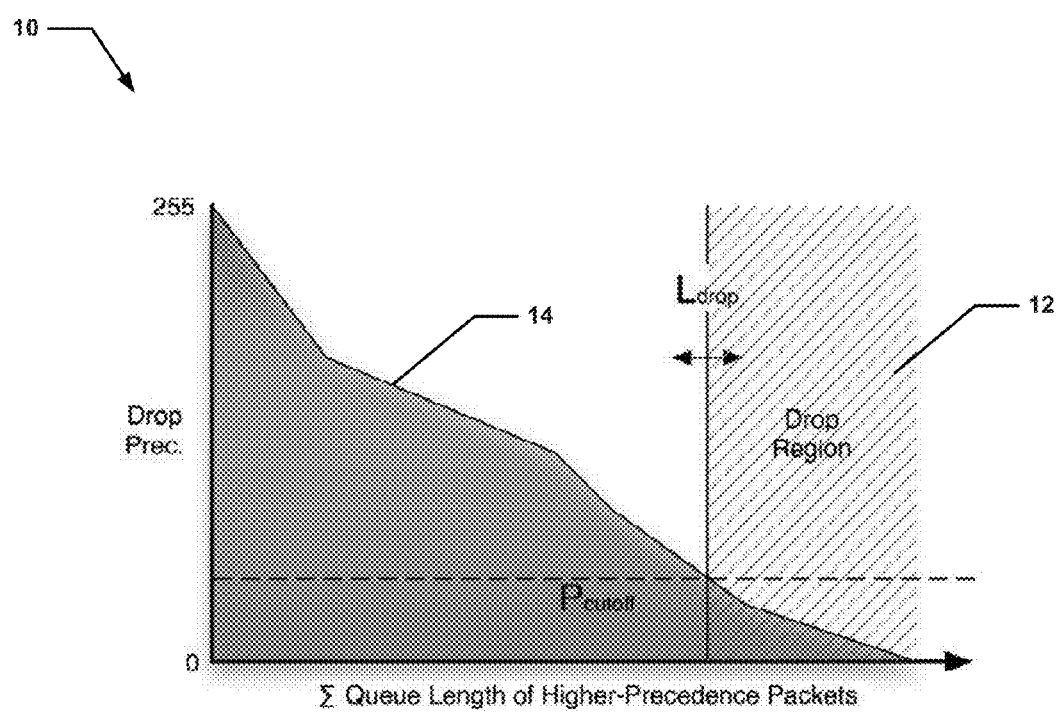
FIG. 1 depicts a graph of drop precedence value versus a queue length of higher-precedence packets.

Referring to FIG. 1, a graph 10 is shown. In graph 10, the vertical axis is the drop precedence. Here, 256 precedence levels are possible, by use of an 8-bit drop precedence field. The horizontal axis shows the sum of the queue length of higher precedence packets. Also shown is a "Drop region" 12, defined by the threshold value $L_{drop}$ wherein packets falling into this region are dropped since the sum of queued packet sizes of all higher drop precedence values is greater than this latency threshold value. When the queue exceeds the $L_{drop}$ value for a particular precedence, any packets received having that precedence value will be dropped. The line $P_{cutoff}$ shows the intersection of curve 14 with the $L_{drop}$ value.

In one particular embodiment a "grooming" enterprise border router is used to mark the packets with a drop precedence value (other embodiments may use a source host computer or application for this task). The content and/or classification of the packet is looked at, and a classification is performed based on a predetermined policy. The grooming router can use almost the same classification rules as are currently used for classifying flows by enterprise border routers. The difference is that the classifying is done on a per packet basis instead of a per flow basis. There are several different ways for the grooming router to assign a drop precedence value to a packet. Some packets in a same flow are more important than other packets of the same flow, and the more important packets are given a higher drop precedence value. For example, in a video application, key frames would be given a higher drop precedence value than incremental frames. While this can be done at the grooming router, this may also be done at the application server itself, and the grooming router would not be required to mark these packets with a drop precedence value since the packets have already been classified.

Figure 2:
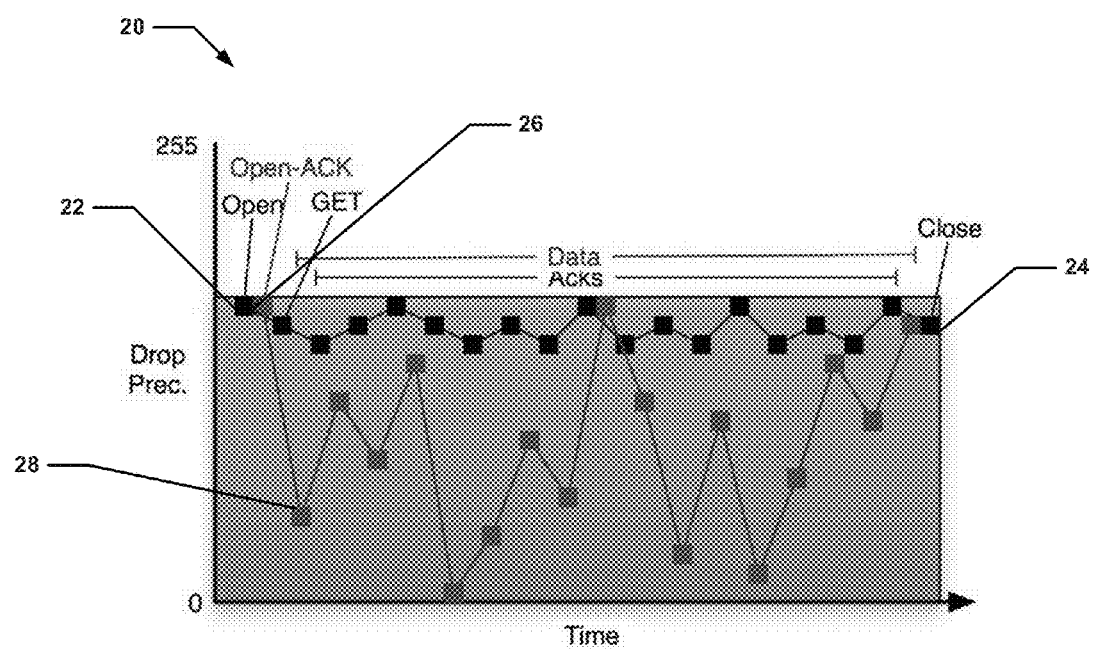
FIG. 2 depicts a graph of drop precedence value versus time for TCP packet flows.

Referring now to FIG. 2, a Transmission Control Protocol (TCP) marking example is shown. A graph 20 is shown having the drop precedence value on a vertical axis and time on the horizontal axis. The drop precedence of control packets (e.g. Open 22 or Close 24 or acknowledgements 26) is given a higher drop precedence value than other packets (data 28). Since the control packets (22, 24, 26) are more important than the data packets 28 the control packets are given a higher drop precedence value, whereas the data packets are given various lower drop precedence values. For example, if a user is accessing a web site it is more important to establish the link (using the control packets) since the user doesn't want to wait a period of time to open a web page, than it is for a particular file to download (the data packets) from the web page.

The data packets are given random or pseudo-random drop precedence values from a range of values that the classifier assigned to the TCP session. This randomness, in conjunction with a PDQoS enforcement mechanism at congestion points, performs the same function as RED does in current routers—it causes flows to be penalized semi-randomly, based on queue depths, causing TCP backoff to be de-synchronized at a given congestion point. (It may also be worth noting that PDQoS-marked flows will still work with classical RED-based routers, if the classical router classifies all the packets of various drop precedences used by the flow as belonging to the same queue.)

Figure 3:
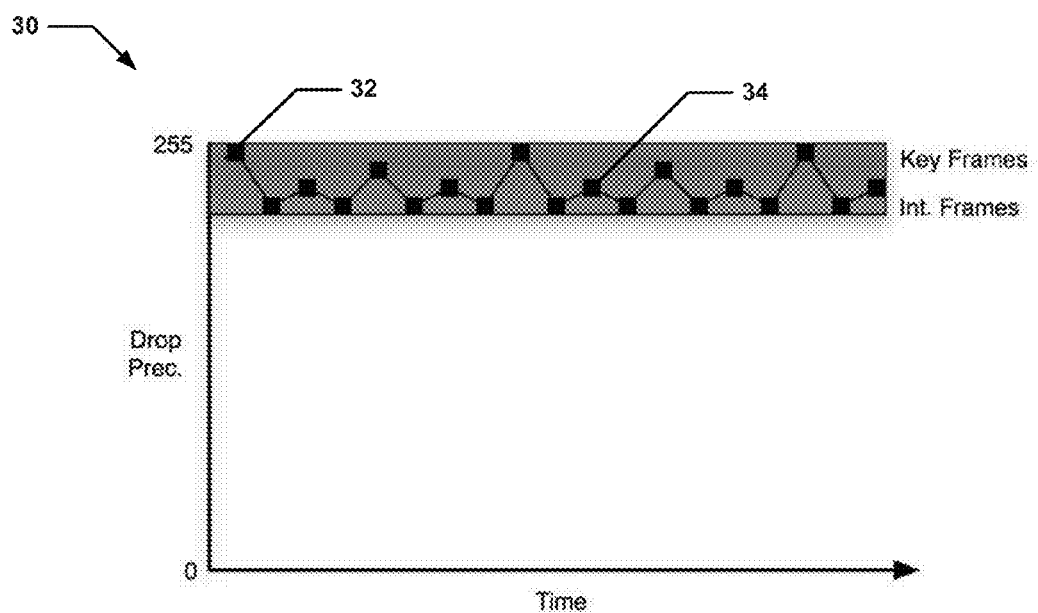
FIG. 3 depicts a graph of drop precedence value versus time for video packet flows.

Referring now to FIG. 3, a video-marking example is shown. In this graph 30, the vertical axis is again the drop precedence value and the horizontal axis is time. Here, all packets of the entire video are given a relatively high drop precedence value, since it is desirable not to drop any packets of the video as the quality of the video would be degraded when packets are dropped. Within the video flow, packets which are key frames 32 are given the highest drop precedence value while incremental packets 34 of the video flow are given lower drop precedence values than the key frames 32, but are still given a relatively high drop precedence value as compared to other data that might be occurring on the router. Thus, in this example, incremental video frames 34 would be dropped prior to key frames 32 being dropped in the event congestion is encountered.

The drop precedence methodology is straight forward to implement and manage. One big advantage offered by the drop precedence methodology is that since no packet re-ordering is done, no packet re-ordering has to be handled. As a direct result, a single simple, cheap Dynamic Random Access Memory (DRAM) First In/First Out (FIFO) buffer can be used. Additionally, there is no signaling or per-flow state that has to be maintained or monitored. A per-port set of traffic counters (a total of 256, one for each drop precedence level) can be used. On a per customer arrangement, there are two per-customer Service Level Agreement (SLA) variables ($P_{max}$, $BW_{total}$). $BW_{total}$ is the total bandwidth the customer is buying from the network provider. $P_{max}$ is the maximum precedence value the network provider allows the user to send at. In this type of environment, the Internet Service Provider (ISP) is not responsible for managing the edge routers, instead the customers manage edge-grooming routers and define how their traffic is going to be treated by the network. This is one particular type of SLA, and probably the simplest (and thus most likely to be used). The BWtotal amount is split evenly among all the drop precedence values 0 . . . Pmax—i.e., the customer gets BWtotal/(Pmax+1) bandwidth available over each of the precedences 0 ... Pmax, measured over whatever time interval the SLA is applied to.

There can be two types of network traffic. Traffic that is latency sensitive (low-latency traffic) such as voice and video conferencing, and traffic that is not latency sensitive (normal). Low latency support can be accomplished by providing a two-level priority scheme. The two-level priority scheme incorporates two output queues, a low-latency output queue and a normal output queue. Thus, for incoming traffic, traffic having a low-latency is sent to the low-latency queue and normal traffic is sent to the normal queue. The low-latency queue is high priority, and typically only a relatively few precedence levels are reserved for low-latency traffic. Low-latency traffic tends to be inelastic, and therefore doesn't require many levels. It is also possible to overlap levels if other means are used to pick a queue (e.g. which port number is used). The low-latency traffic uses a separate small SRAM buffer which has its own queue threshold ($L_{lowlat}$) which is lower than that of normal traffic.

Figure 4:
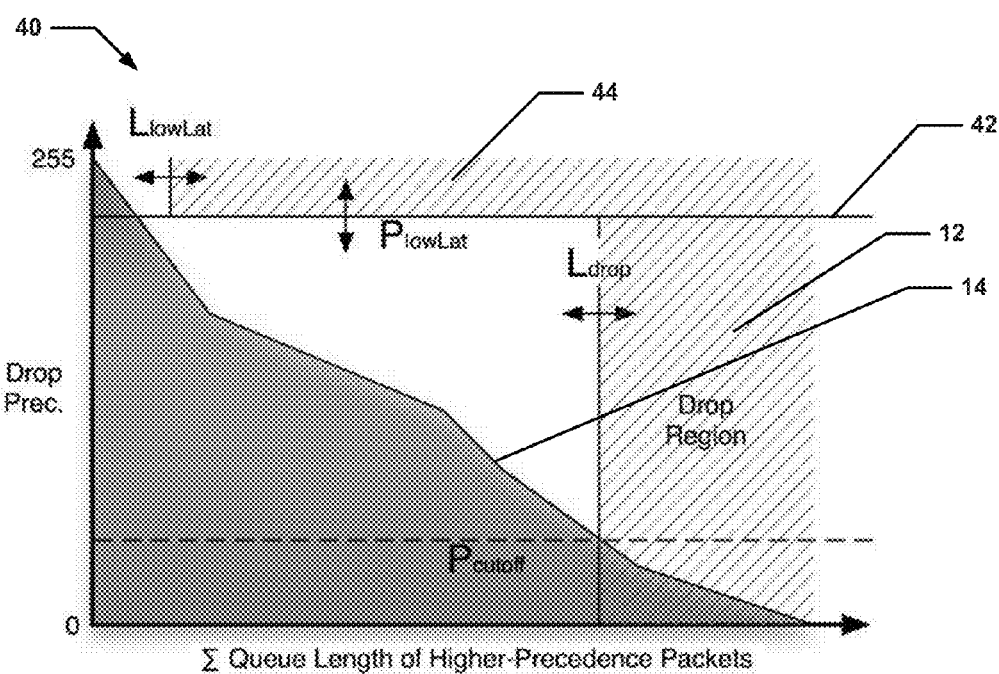
FIG. 4 depicts a graph of drop precedence value versus a queue length of higher-precedence packets for a two-level priority scheme.

An example of this is shown in FIG. 4. Here a graph 40 is shown wherein the vertical axis is the drop precedence. Here, 256 precedence levels are possible, by use of an 8-bit drop precedence field. The horizontal axis shows the sum of the queue length of higher precedence packets. Also shown is a "Drop Region" 12, defined by the threshold value $L_{drop}$ wherein packets falling into this region are dropped since the sum of queued packet sizes of all higher drop precedence values is greater than this latency threshold value. When the queue exceeds the $L_{drop}$ value for a particular precedence, any packets received having that precedence value will be dropped. The line $P_{cutoff}$ shows the intersection of curve 14 with the $L_{drop}$ value. In addition, for low-latency traffic a precedence level $L_{lolat}$ 40 is determined for this type of traffic. Also shown is a "low-latency drop region" 44, defined by the threshold value $L_{lowlat}$ wherein packets falling into this region are dropped since the sum of queued packet sizes of all higher drop precedence values is greater than this latency threshold value $L_{lowlat}$. When the queue exceeds the $L_{lolat}$ value for a particular precedence, any packets received having that precedence value will be dropped. The line $P_{lowlat}$ 42 shows the first precedence value in the low-latency region (i.e., it defines the boundary between drop precedences used for low-latency traffic, and drop precedences used for normal traffic).

The presently disclosed methods and techniques for providing precedence drop QoS replaces RED for elastic TCP traffic, and gives applications and/or users control over what traffic is most important and what traffic is dropped first which in turn provides new capabilities and/or applications.

One such application involves call admission control for inelastic traffic (e.g. VoIP). If the precedence level is set to a specific value for all VoIP traffic, then the VoIP traffic is getting through entirely until there is enough congestion in the network that the traffic having a higher precedence than the VoIP traffic will cause the VoIP traffic to completely drop out, which his the desired behavior for VoIP traffic. This is compared to conventional techniques where only a fraction of the VoIP traffic (e.g., ten percent) drops out. However, for VoIP traffic, if ten percent is going to be dropped, then the whole VoIP traffic should be dropped.

Precedence drop QoS supports priority applications and pre-emption applications. The basic mechanism allows users to define customized QoS behaviors without the ISP being required to define the customized behavior. PDQoS statistics collection is added at an edge of a network. Customer traffic is then counted at each of 256 levels. For a fixed customer SLA, the total amount of traffic is limited per level (may also limit the levels usable). The network provider can either enforce the SLA and drop traffic exceeding the SLA or can charge additional fees for excess use. The network provider can also use a flexible pricing (usage-sensitive) arrangement, wherein the customer is charged a different price per 1 Mbit sent for each level. Customers could optimize marking to minimize costs. Such an environment would require the far end to feed back which levels get through, with the customers using the lowest precedence level that gets through to minimize their costs.

Figure 5:
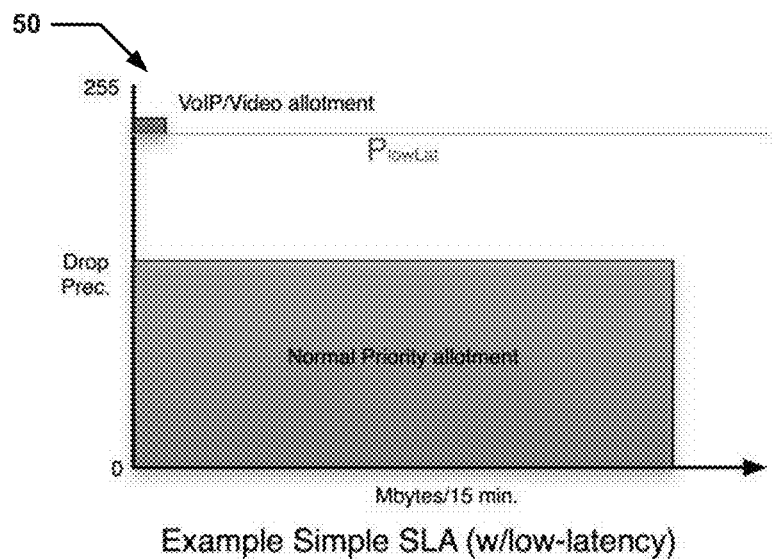
FIG. 5 depicts a graph of drop precedence value versus a packet rate for a Service Level Agreement (SLA)
Figure 6:
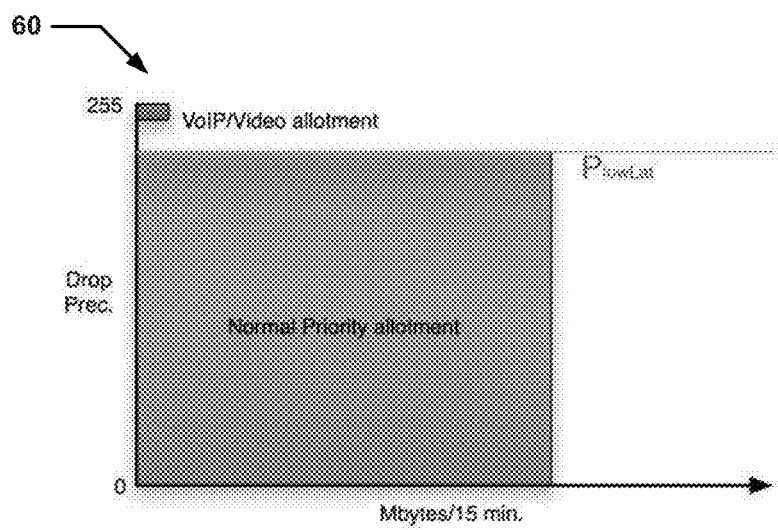
FIG. 6 depicts a graph of drop precedence value versus a packet rate for a preferred user Service Level Agreements (SLA)

Referring now to FIG. 5, a graph 50 is shown, the graph relating to a sample SLA agreement. In this example, most traffic is sent at a lower drop precedence level, and the higher precedence levels are used during bursts of traffic. FIG. 6 shows a graph 60 relating to an alternate SLA agreement. The difference between the SLAs shown in FIGS. 5 and 6 is that the SLA of FIG. 5 limits the normal priority traffic to a smaller drop precedence range than in FIG. 6, though the total bandwidth for normal traffic (area of the lower rectangle) is the same for both customers. This allows the customer with the "premium" SLA shown in FIG. 6 to get traffic through congestion points that would totally stop traffic from a customer using the SLA shown in FIG. 5, though only some fraction of his traffic would be getting through (above the Pcutoff value of the congestion point). Both SLAs include a small amount of low latency bandwidth, but the precedence ranges used for the two SLAs are different, again giving the customer with the SLA shown in FIG. 6 an advantage when congestion occurs.

Figure 7:
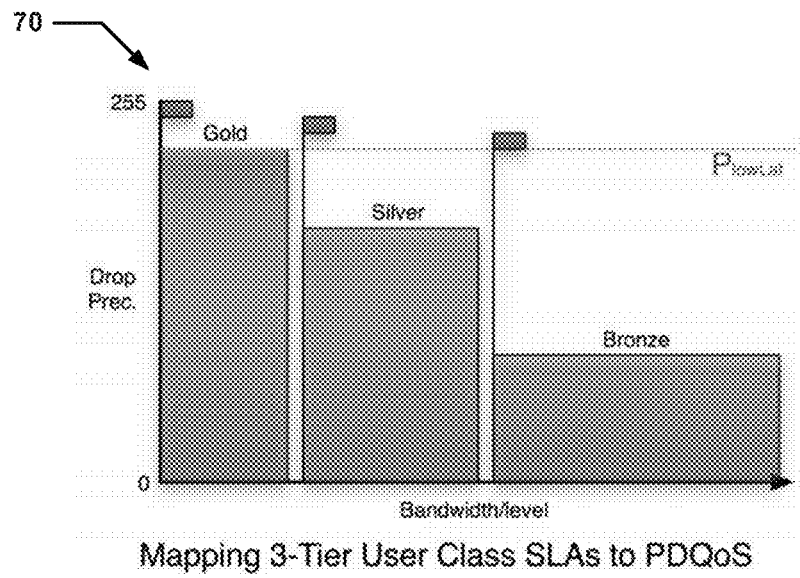
FIG. 7 depicts a graph of drop precedence value versus a packet rate per level for a three tier user class Service Level Agreements (SLA)
Figure 8:
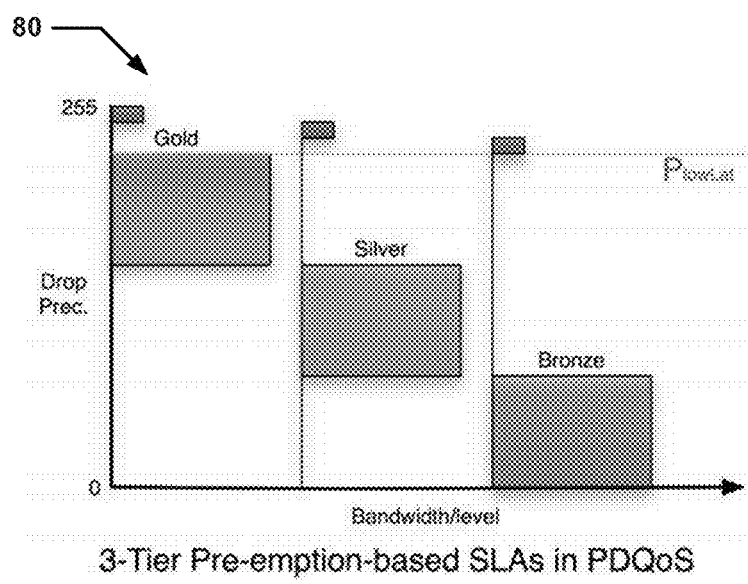
FIG. 8 depicts a graph of drop precedence value versus a packet rate per level for a three tier pre-emption-based Service Level Agreements (SLA)

FIG. 7 shows a graph 70 relating to a 3-tier user class SLA arrangement. In this environment, there are three distinct service levels, namely gold, silver and bronze. The gold level includes a higher top-end drop precedence value than the silver or bronze levels, as well as all drop precedence values beneath the top-end drop precedence value. The silver level includes a higher top-end drop precedence value than the bronze level, as well as all drop precedence values beneath the top-end drop precedence level. The silver level top-end drop precedence value is less than the gold level top-end drop precedence value. The bronze level includes a lower top-end drop precedence value than the silver or gold levels, as well as all drop precedence values beneath the top-end drop precedence value. FIG. 8 shows a graph 80 relating to a different 3-tier SLA, referred to herein as a pre-emption based SLA. In this type of arrangement, the gold level of service includes a set of drop precedence values that are higher than, and do not overlap with, either the silver or bronze service levels. Similarly, the silver level of service includes a set of precedence value that are less than the gold level set of precedence values but are higher than the bronze level of precedence values. The bronze level of service includes a set of drop precedence values that are lower than, and do not overlap with, either the silver or gold service levels.

Figure 9:
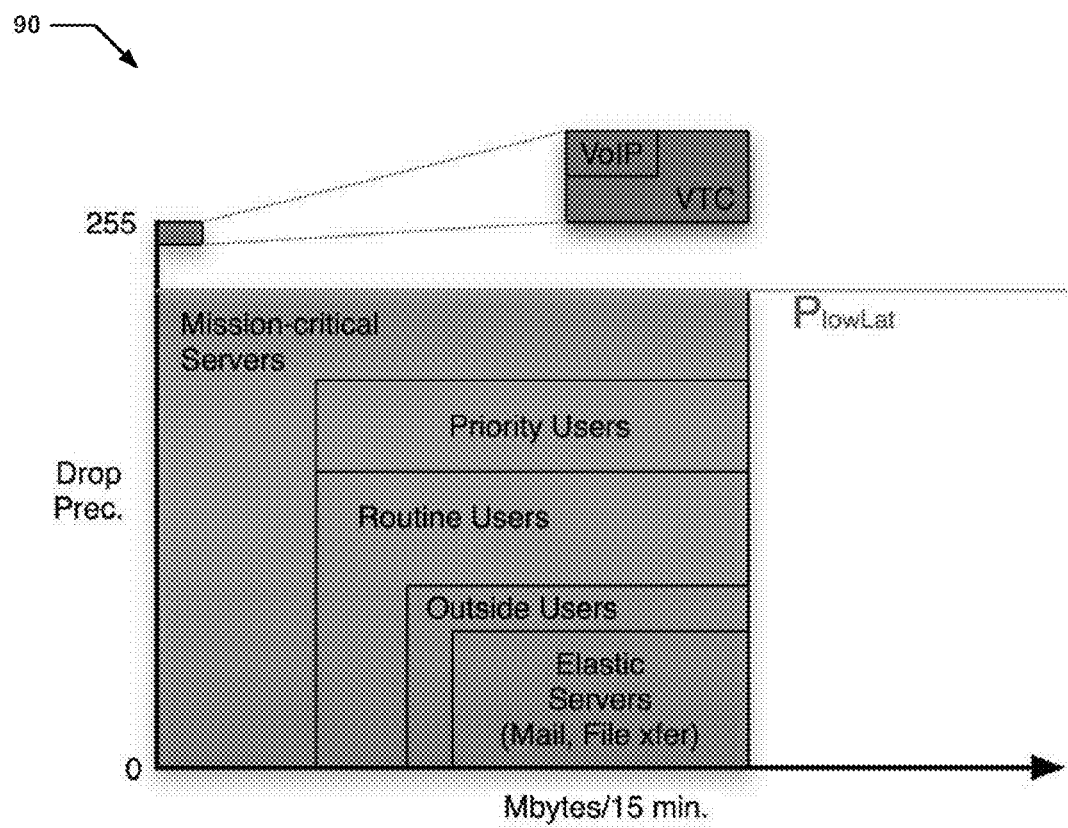
FIG. 9 depicts a graph of drop precedence value versus a packet rate for different SLA users.

FIG. 9 is a graph 90 showing how available bandwidth can be distributed. In this example, VoIP and Video Teleconferencing (VTC) having the highest priority. Mission-critical servers have the next highest priority followed by priority users then routine users. Outside users have the next to lowest priority, with elastic servers having the lowest priority. FIG. 9 illustrates how the classification rules in a grooming router might carve up the available bandwidth at various drop precedence levels. Note that the various normal-latency applications use all the precedence levels, but some of them get more of various higher drop precedences. (Again, the area of a block indicates its total bandwidth. Inverse-L-shaped blocks allow the high-precedence applications to use both a significant amount of higher-precedence bandwidth, as well as use some additional bandwidth at lower precedences, when those levels are getting through.) This is one of any number of such carve-up schemes; generally the end-user would define these as policies to the enterprise border grooming router. In fact, these policies might be defined using a simple GUI interface that presented a diagram much like FIG. 9.

Another use of PDQoS utilizes feedback of Pcutoff to the source (or its grooming router). This would have either the destination or intermediate routers report the minimum value of Pcutoff along the route of the flow to the source, allowing the source to simply not send packets with lower drop precedence values. A variant of this has upstream routers being informed of Pcutoff values on each link of the network, and using this information to pre-emptively drop packets that will likely be dropped as the flow progresses downstream. This frees up bandwidth that would be normally be used by packets being dropped further along each flow's path through the network core, giving the network a higher effective capacity in congestion scenarios.

Still another use of PDQoS involves PDQoS-based Routing. If the link $P_{cutoff}$ is sent via routing, traffic can be re-routed to avoid congestion (congestion-aware routing). The router would select a path to the destination with lowest max $P_{cutoff}$ value. This is potentially better than a link utilization metric, as $P_{cutoff}$ implies not just link load, but also value to user. Like any differential routing scheme, routing performance will be subject to stability and routing-loop issues.

The PDQoS enforcement algorithm works as follows. There are three sub-algorithms which typically operate as independent processes or threads: initialization, packet arrival processing, and packet transmission processing.

The initialization thread is performed once at the start of time (e.g. at interface reset). The pseudo code for this is shown below.
1) QLen[p] is set to 0 for all drop precedences p in the range 0 . . . Pmax The packet arrival processing thread pseudo code is listed below.
1) Wait for a packet to arrive, and extract its drop precedence value P and packet length L
2) If QLen[P]+L>Ldrop, discard the packet and go to 1) to wait for another packet to arrive, else go to 3)
3) For all values p<=P (from the packet), QLen[p]=QLen[p]+L
4) Queue the packet on the end of the transmission queue
5) Go to step 1) to wait for another packet arrival The packet transmission processing thread pseudo code is listed below.
1) Wait until the transmitter can accept another packet
2) Dequeue the packet at the head of the transmission queue and extract its length L and drop precedence P.
3) For all values p<=P (from the packet), QLen[p]=QLen[p]−L
4) Deliver the packet to the transmitter for sending
5) Go to step 1) to wait for the transmitter to be ready to accept another packet The queue between the arrival and transmission processes is a simple FIFO, and the size will be related to Ldrop (at least Ldrop plus enough room for one maximum packet size at every precedence value 0 . . . Pmax, or maybe larger; i.e. minimum queue capacity=Ldrop+(Pmax*<maximum packet size>). For high-speed implementation, the QLen table can be structured as a binary tree of tables, reducing the number of adds and subtracts from an average of Pmax/2 to log 2(Pmax).

Figure 10A:
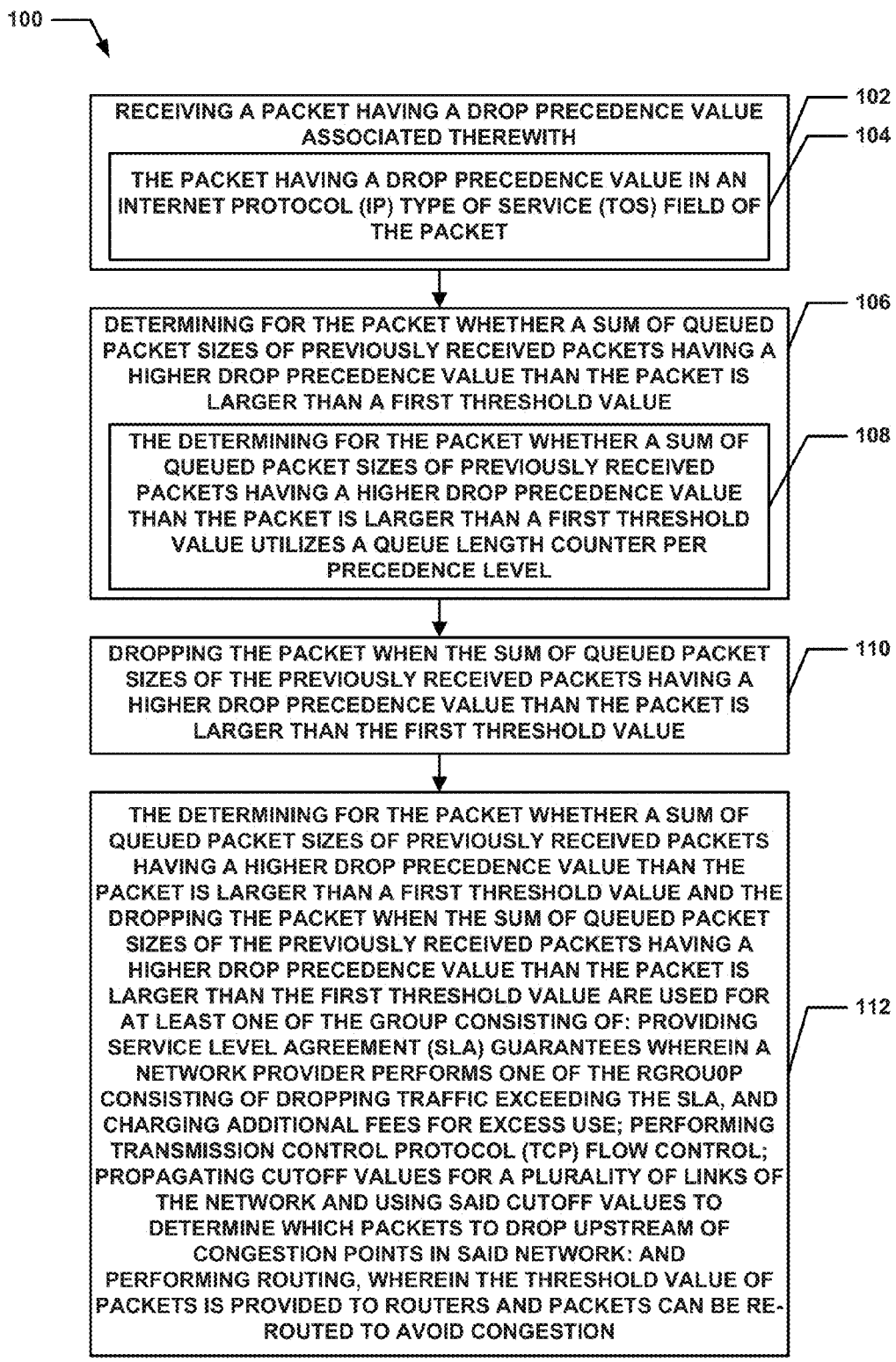
FIGS. 10A and 10B are a flow diagram of a particular embodiment of a method for performing drop precedence quality of service in accordance with embodiment of the present invention.
Figure 10B:
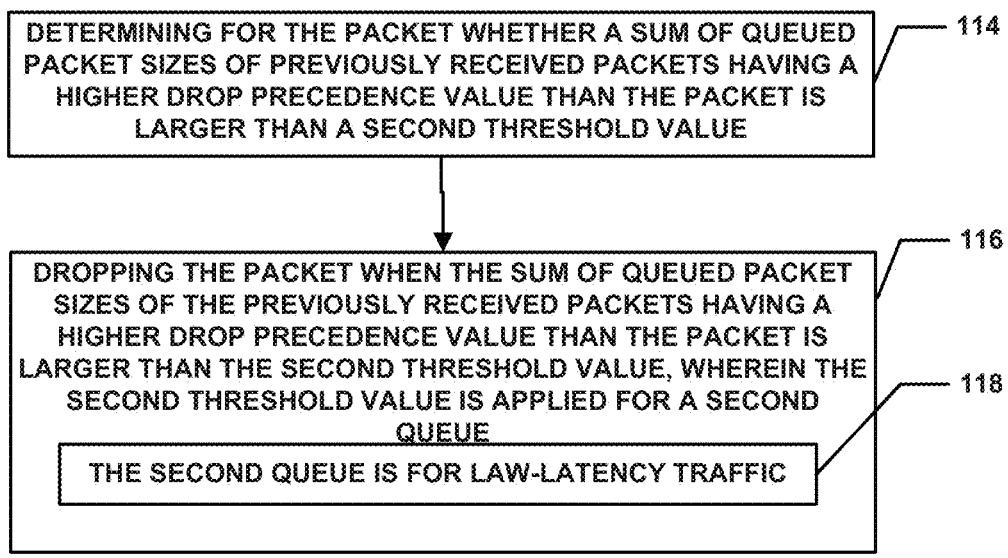
Figure 11:
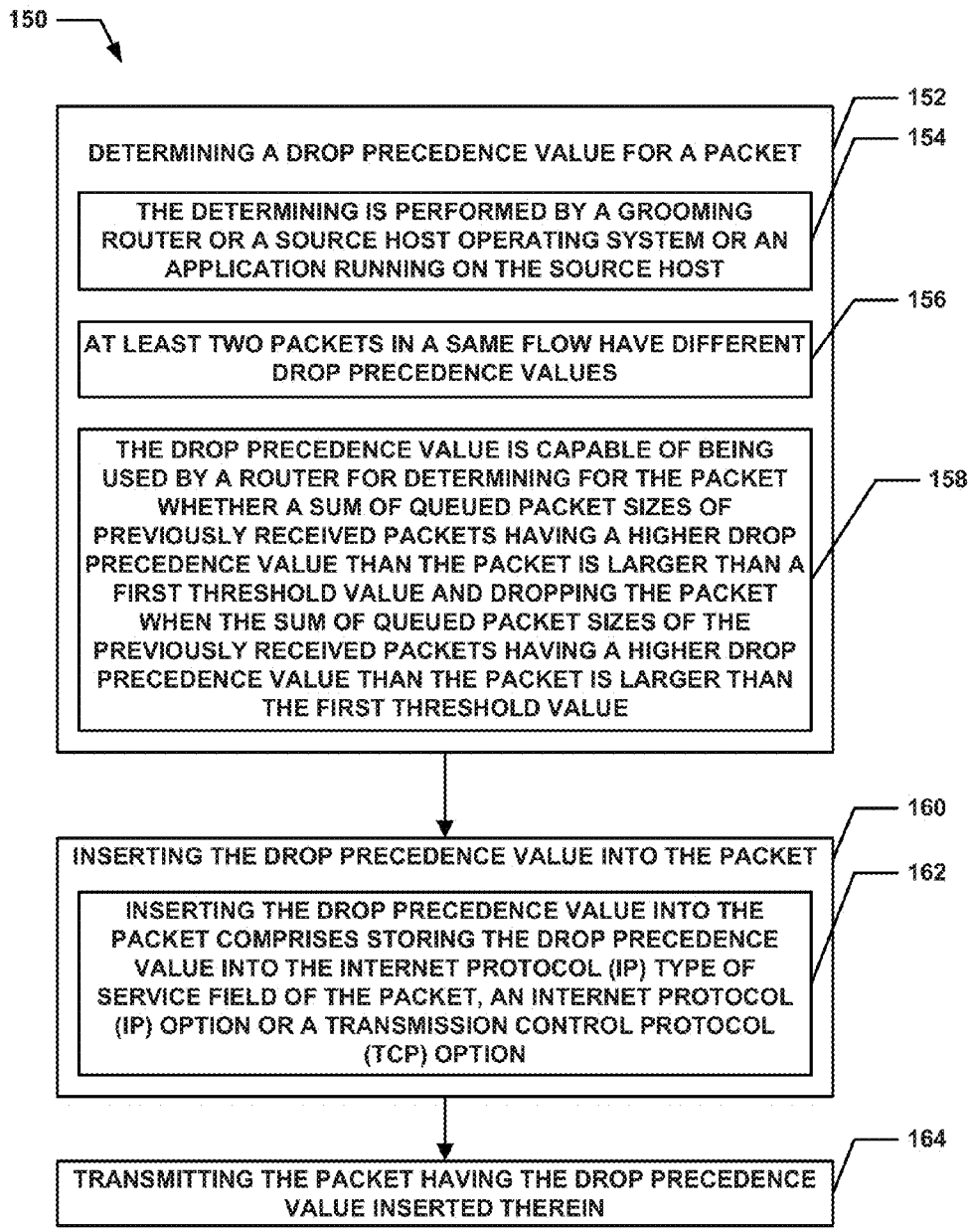
FIG. 11 is a flow diagram of a particular embodiment of a method for assigning drop precedence values for packets in accordance with embodiment of the present invention.

A flow chart of particular embodiments of the presently disclosed methods are depicted in FIGS. 10A, 10B and 11. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 10A and 10B, a method 100 of routing a packet having a drop precedence value is shown. Method 100 begins with processing block 102 which recites receiving a packet having a drop precedence value associated therewith. The packet may be received from a grooming router or from a source which inserts the drop precedence value in the packet. Processing block 104 discloses wherein the receiving a packet having a drop precedence value associated therewith comprises the packet having a drop precedence value in an Internet Protocol (IP) Type of Service (TOS) field of the packet. Two packets in a same flow may have different drop precedence values.

Processing block 106 states determining for the packet whether a sum of queued packet sizes of previously received packets having a same or higher drop precedence value than the packet is larger than a first threshold value. As recited in processing block 108, the determining for the packet whether a sum of queued packet sizes of previously received packets having a same or higher drop precedence value than the packet is larger than a first threshold value utilizes a queue length counter per precedence level.

Processing block 110 discloses dropping the packet when the sum of queued packet sizes of the previously received packets having a same or higher drop precedence value than the packet is larger than the first threshold value. The packet is forwarded when the sum of queued packet sizes of the previously received packets having a same or higher drop precedence value than the packet is less than the first threshold value.

Processing block 112 states wherein the determining for the packet whether a sum of queued packet sizes of previously received packets having a same or higher drop precedence value than the packet is larger than a first threshold value and the dropping the packet when the sum of queued packet sizes of the previously received packets having a same or higher drop precedence value than the packet is larger than the first threshold value are used for at least one of the group consisting of providing Service Level Agreement (SLA) guarantees wherein a network provider performs one of the rgroup consisting of dropping traffic exceeding the SLA, and charging additional fees for excess use; performing Transmission Control Protocol (TCP) flow control; propagating cutoff values for a plurality of links of the network and using said cutoff values to determine which packets to drop upstream of congestion points in said network; and performing routing, wherein the threshold value of packets is provided to routers and packets can be re-routed to avoid congestion.

Processing continues with processing block 114 which discloses determining for the packet whether a sum of queued packet sizes of previously received packets having a same or higher drop precedence value than the packet is larger than a second threshold value.

Processing block 116 states dropping the packet when the sum of queued packet sizes of the previously received packets having a same or higher drop precedence value than the packet is larger than the second threshold value, wherein the second threshold value is applied for a second queue. As shown in processing block 118, the second queue is for low-latency traffic. The actions described in processing blocks 114 and 116 provide a PDQoS involving two types of traffic (e.g., low latency traffic and normal traffic).

Referring now to FIG. 11, a particular embodiment of a method 150 for assigning a drop precedence level to a packet is shown. Method 150 begins with processing block 152 which discloses determining a drop precedence value for a packet. As shown in processing block 154 the determining is performed by either a grooming router, a source host operating system or an application running on the source host. Processing block 156 states at least two packets in a same flow have different drop precedence values. Processing block 158 recites wherein the drop precedence value is capable of being used by a router for determining for the packet whether a sum of queued packet sizes of previously received packets having a same or higher drop precedence value than the packet is larger than a first threshold value and dropping the packet when the sum of queued packet sizes of the previously received packets having a same or higher drop precedence value than the packet is larger than the first threshold value.

Processing block 160 recites inserting the drop precedence value into the packet. As shown in processing block 162, the inserting the drop precedence value into the packet comprises storing the drop precedence value into value in one of the group consisting of the Internet Protocol (IP) Type Of Service (TOS) field of the packet, an Internet Protocol (IP) option and a Transmission Control Protocol (TCP) option.

Processing block 164 discloses transmitting the packet having the drop precedence value inserted therein. The algorithm used to set the precedence value is typically going to be user-configurable, and will often be expressed as set of policy statements to configure the grooming router (or host OS, or application). Policies will often consider the general type of traffic (such as the SLA carve-up in FIG. 9 shows), as well as protocol and application data details (as discussed in the marking examples shown in FIGS. 2 and 3).

Figure 12:
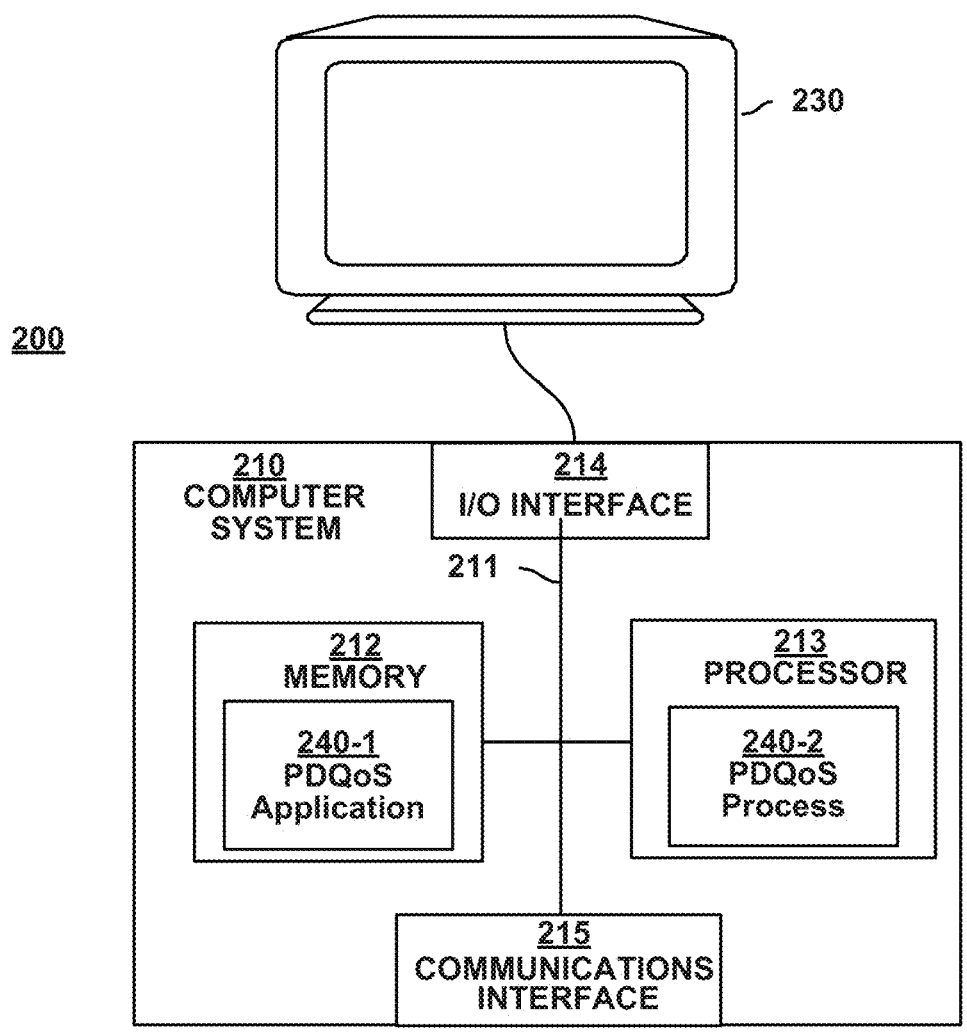
FIG. 12 illustrates an example computer system architecture for a computer system that performs drop precedence quality of service in accordance with embodiments of the invention.

FIG. 12 is a block diagram illustrating an example computer system 200 for implementing PDQoS function 240 and/or other related processes to carry out the different functionality as described herein.

As shown, computer system 200 of the present example includes an interconnect 211 that couples a memory system 212 and a processor 213 an input/output interface 214, and a communications interface 215.

As shown, memory system 212 is encoded with PDQoS application 240-1. PDQoS application 240-1 can be embodied as software code such as data and/or logic instructions (e.g., code stored in the memory or on another computer readable medium such as a disk) that support functionality according to different embodiments described herein.

During operation, processor 213 of computer system 200 accesses memory system 212 via the interconnect 211 in order to launch, run, execute, interpret or otherwise perform the logic instructions of the PDQoS application 240-1. Execution of PDQoS application 240-1 produces processing functionality in PDQoS process 240-2. In other words, the PDQoS process 240-2 represents one or more portions of the PDQoS application 240-1 (or the entire application) performing within or upon the processor 213 in the computer system 200.

It should be noted that, in addition to the PDQoS process 240-2, embodiments herein include the PDQoS application 240-1 itself (i.e., the un-executed or non-performing logic instructions and/or data). The PDQoS application 240-1 can be stored on a computer readable medium such as a floppy disk, hard disk, or optical medium. The PDQoS application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of PDQoS application 240-1 in processor 213 as the PDQoS process 240-2. Those skilled in the art will understand that the computer system 200 can include other processes and/or software and hardware components, such as an operating system that controls allocation and use of hardware resources associated with the computer system 200.

As described above, PDQoS is a method for achieving prioritized quality of service via a combination of priority assignments to each packet entering a network and a priority-based dropping scheme at congested queues in the network. In PDQoS, packets in a flow are assigned priorities uniformly at random from the priority band for the flow. When a packet arrives at a specific priority, the total queue occupancy at or above the packet's priority is compared to a parameter, $L_{drop}$. If that queue occupancy is larger than $L_{drop}$, the arriving packet is dropped.

Prioritization between different flows is achieved by assigning different priority bands to different flows. The expectation is that flows with a higher priority band would achieve higher throughput in the network.

The original PDQoS invention dedicates certain priorities as low latency traffic. Low latency traffic includes any traffic which must arrive at the destination as quickly as possible (for instance: synchronous communication, such as Voice Over IP). Low latency traffic is differentiated from normal latency traffic by PDQoS based on its priority, and the low latency traffic is placed in a separate queue. This special low latency queue is given a higher priority than the normal latency queue, such that whenever there is a packet waiting in the low latency queue, that packet will be transmitted before any packets in the normal latency queue.

Since low latency traffic has its own queue, it also has its own copy of the PDQoS prioritization mechanism with its own drop parameter, $L_{lowlat}$. That is, when a low latency packet arrives at a specific priority, the low latency queue occupancy at or above the packet's priority is compared to $L_{lowlat}$, and if greater, then the packet is dropped. $L_{lowlat}$ is expected to be significantly lower than $L_{drop}$, since this value controls the length of the queue and therefore the latency.

Figure 13:
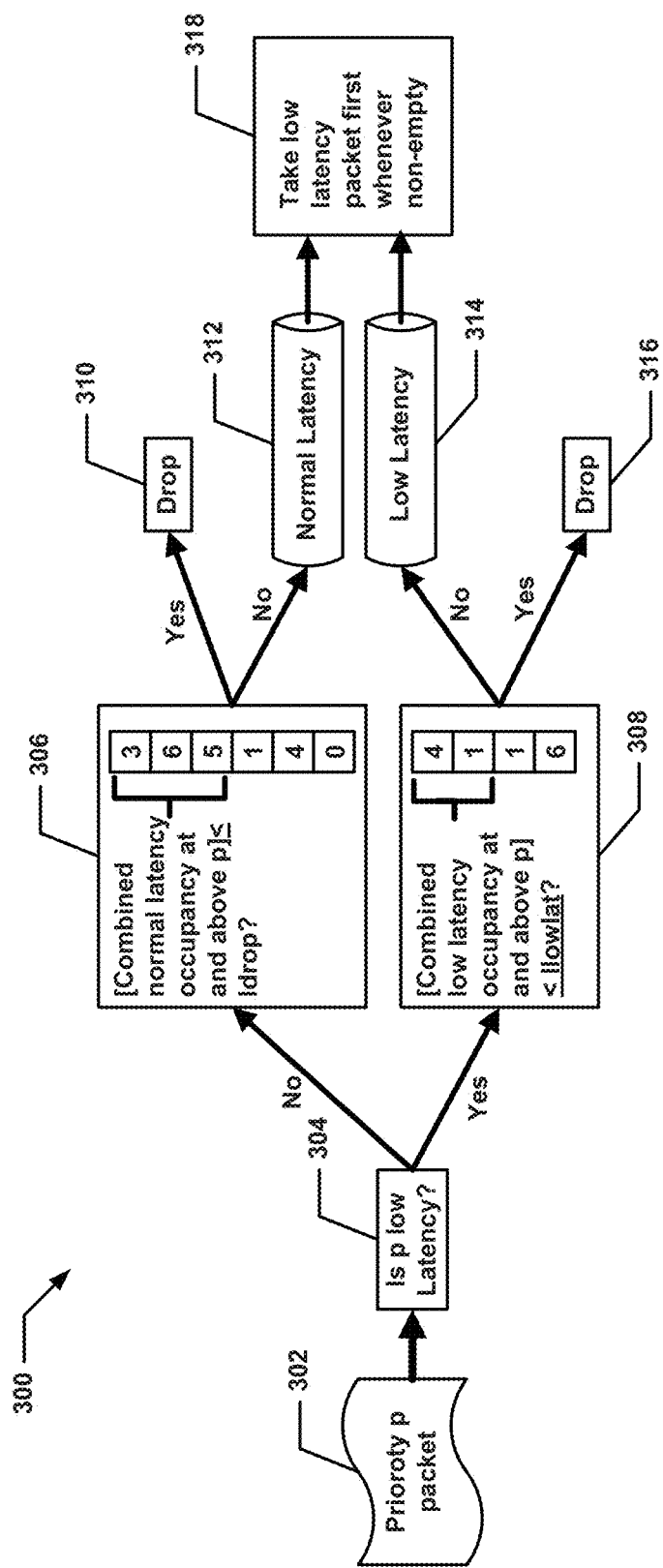
FIG. 13 illustrates an example block diagram for PDQoS processing.

FIGS. 4 and 13 show the original PDQoS low latency design concept as described above. The low latency design described above inherently limits PDQoS, since there is no mechanism for prioritizing low latency traffic against normal latency traffic. Each is prioritized separately. If low latency traffic is arriving at a constant rate, this is likely to cause complete starvation of normal latency traffic (since the low latency queue has a strictly higher priority).

If low latency traffic is adaptive (TCP traffic, for example), the fact that $L_{lowlat} < L_{drop}$ will cause more drops of low latency traffic than normal, which will cause the low latency traffic to back off more than the normal latency traffic, giving more space for normal latency traffic. In other words, when the low latency traffic is adaptive, low latency traffic is likely to be starved out.

Referring now to FIG. 13, the original PDQoS system 300 is shown. A packet 302 having a priority p is received. A determination is made at processing block 304 whether the packet is low latency. When the packet is not low latency, the packet is sent to device 306, and when the packet is low latency, it is sent to device 308. At device 306, a determination is made whether the combined normal latency occupancy at and above priority p is less than or equal to the value $L_{drop}$. When the combined normal latency occupancy at and above priority p is less than or equal to the value $L_{drop}$ the packet is dropped as shown at processing block 310. On the other hand, when the combined normal latency occupancy at and above priority p is not less than or equal to the value $L_{drop}$ then the packet is stored in normal latency queue 312. Referring back to device 308, when the packet is low latency then a determination is made whether the combined low latency occupancy at and above priority p is less than or equal to the value $L_{lowlat}$. When the combined normal latency occupancy at and above priority p is less than or equal to the value $L_{lowlat}$ the packet is dropped as shown at processing block 316. When the combined normal latency occupancy at and above priority p is not less than or equal to the value $L_{lowlat}$ the packet is sent to low latency queue 314. At processing block 318 a packet is taken from the low latency queue 314 first whenever there is a packet available, otherwise a packet is taken from the normal latency queue 312.

PDQoS system 300 processes and queues low latency traffic separately from normal latency traffic. This immediately restricts the ability of PDQoS to prioritize between the two types of traffic. The low latency queue always has top priority, so this original design can also cause starvation of normal latency traffic.

By way of the presently described method and apparatus providing Precedence Drop Quality Of Service (PDQoS) with class-based latency differentiation, prioritization of lower latency traffic is combined with prioritization of higher latency traffic. Once the initial prioritization decision has been made across all traffic, lower latency traffic is prioritized again against only lower latency traffic with a different (lower) target queue occupancy. There is one prioritization decision for each latency class at and above the latency of the arriving packet. The lower latency queues are still given a higher transmission priority than the higher latency queues, but a rate limiter is added to lower latency traffic to ensure that higher latency traffic is not starved.

Figure 14:
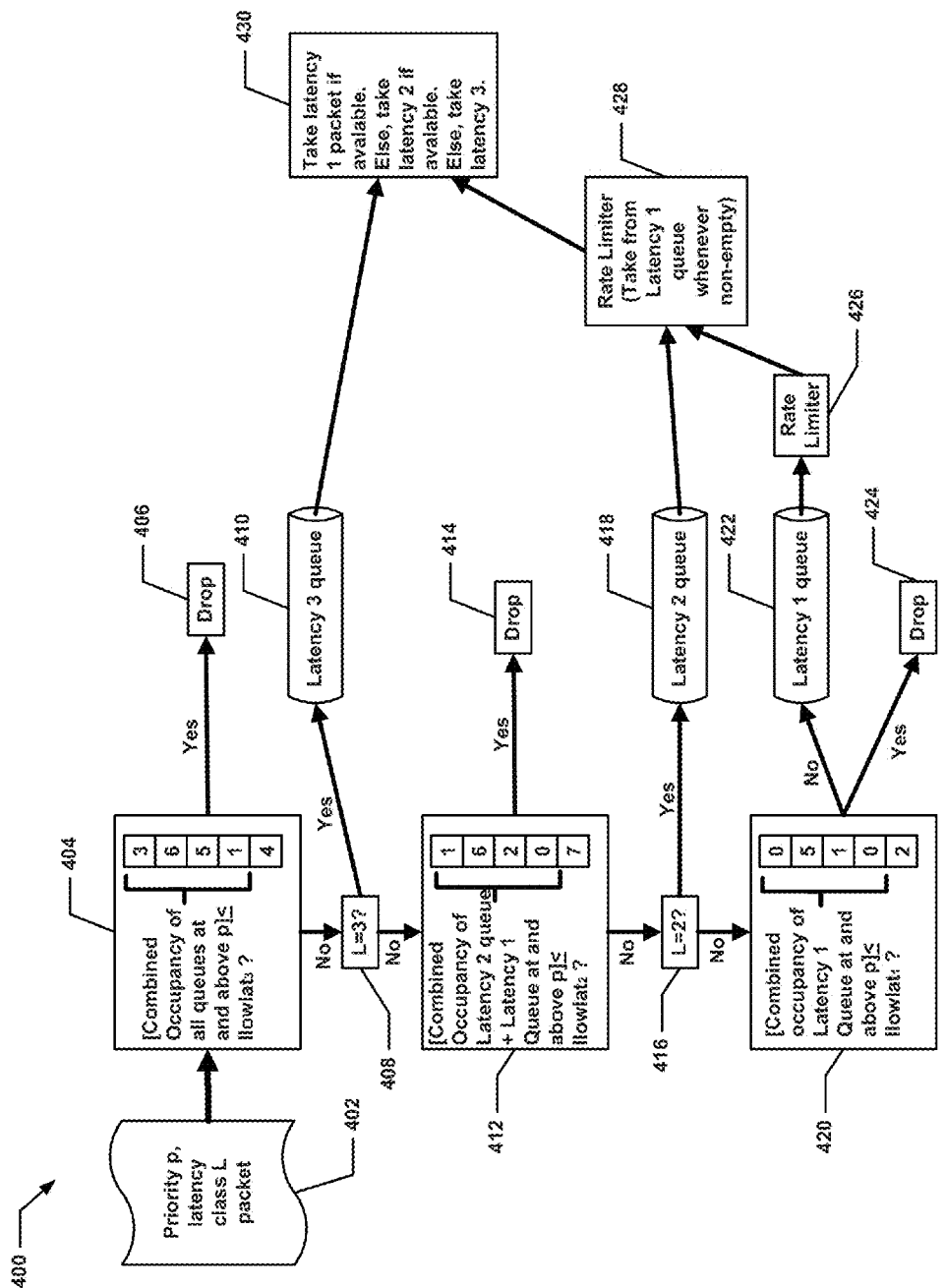
FIG. 14 illustrates an example block diagram for PDQoS with class-based latency differentiation in accordance with embodiments of the invention.

Referring now to FIG. 14 a system 400 providing PDQoS with class-based latency differentiation is shown. A packet 402 having a priority p and latency class L is received. The packet is sent to device 404 where a determination is made whether the combined occupancy of all queues at and above priority p is less than or equal to the value $llowlat_3$. When the combined occupancy of all queues at and above priority p is less than or equal to the value $llowlat_3$ the packet is dropped as shown at processing block 406. On the other hand, when the occupancy of all queues at and above priority p is not less than or equal to the value $llowlat_3$ then the packet is sent to processing block 408. A determination is made at processing block 408 whether the latency class L is equal to 3. When the latency class L is equal to 3, the packet is forwarded to latency 3 queue 410. When the latency class L is not equal to 3, the packet is forwarded to device 412 for further processing.

At device 412 a determination is made whether the combined occupancy of the latency 2 queue and the latency 1 queue at and above priority p is less than or equal to the value $llowlat_2$. When the combined occupancy of the latency 2 queue and the latency 1 queue at and above priority p is less than or equal to the value $llowlat_2$ the packet is dropped as shown at processing block 414. On the other hand, when the combined occupancy of the latency 2 queue and the latency 1 queue at and above priority p is not less than or equal to the value $llowlat_2$ then the packet is sent to processing block 416. A determination is made at processing block 416 whether the latency class L is equal to 2. When the latency class L is equal to 2, the packet is forwarded to latency 2 queue 418. When the latency class L is not equal to 2, the packet is forwarded to device 420 for further processing.

At device 420 a determination is made whether the occupancy of the latency 1 queue at and above priority p is less than or equal to the value $llowlat_1$. When the occupancy of the latency 1 queue at and above priority p is less than or equal to the value $llowlat_1$ the packet is dropped as shown at processing block 424. On the other hand, when the occupancy of the latency 1 queue at and above priority p is not less than or equal to the value $llowlat_1$ then the packet is sent to latency 1 queue 422.

In certain embodiments one or more rate limiters may be used. The output of the latency 1 queue 422 is fed to rate limiter 426. The output of rate limiter 426 as well as the output of latency 2 queue are fed to rate limiter 428. The output of rate limiter 428 is fed to processing block 430 as is the output of latency 3 queue 4120. A latency 1 packet is taken if one is available from rate limiter 428 via rate limiter 426. Otherwise a latency 2 packet will be taken from rate limiter 428 if one is available otherwise a packet from latency 3 queue 410 will be taken.

Figure 15A:
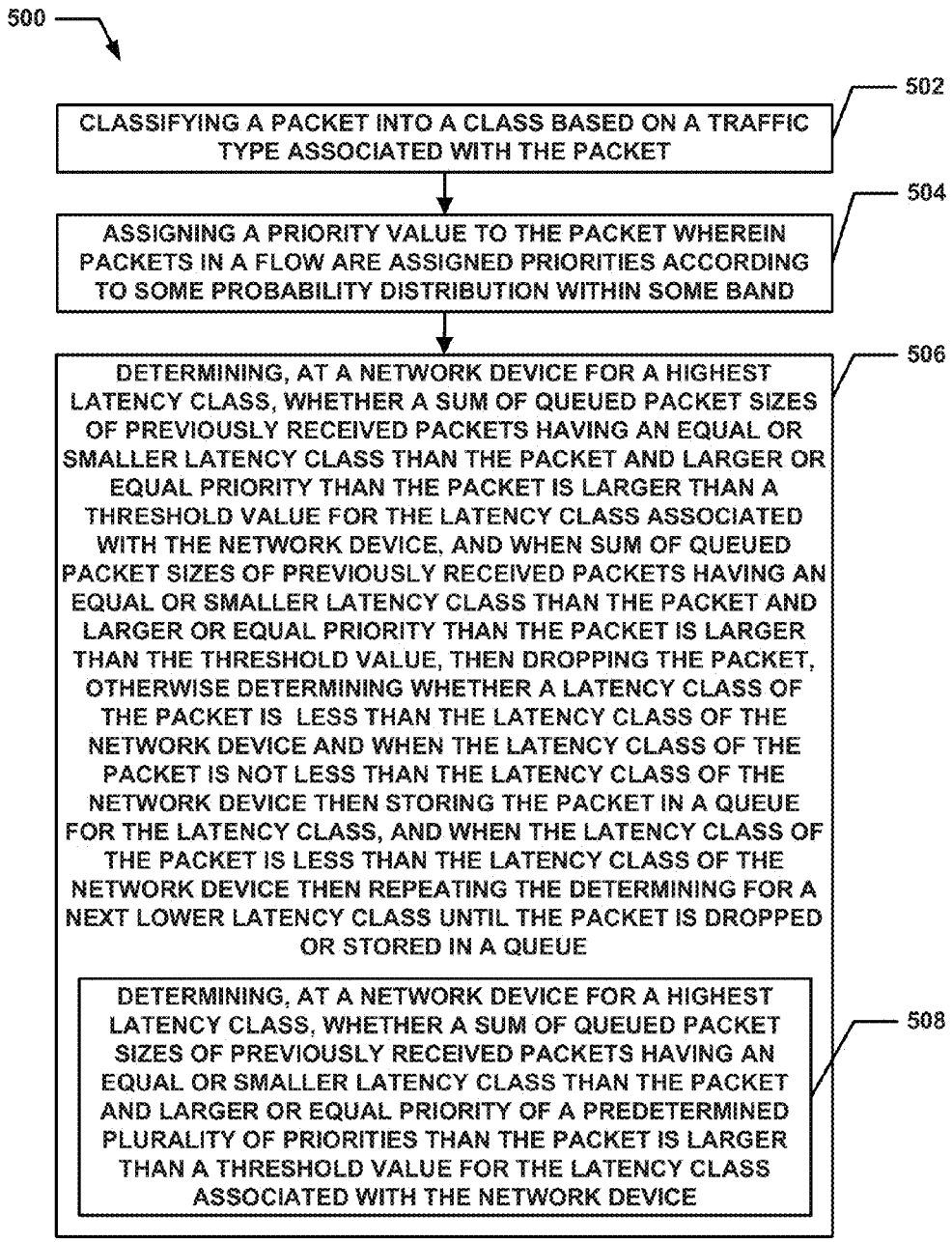
FIGS. 15A and 15B comprise a flow diagram of a particular embodiment of a method for performing PDQoS with class-based latency differentiation in accordance with embodiment of the present invention.
Figure 15B:
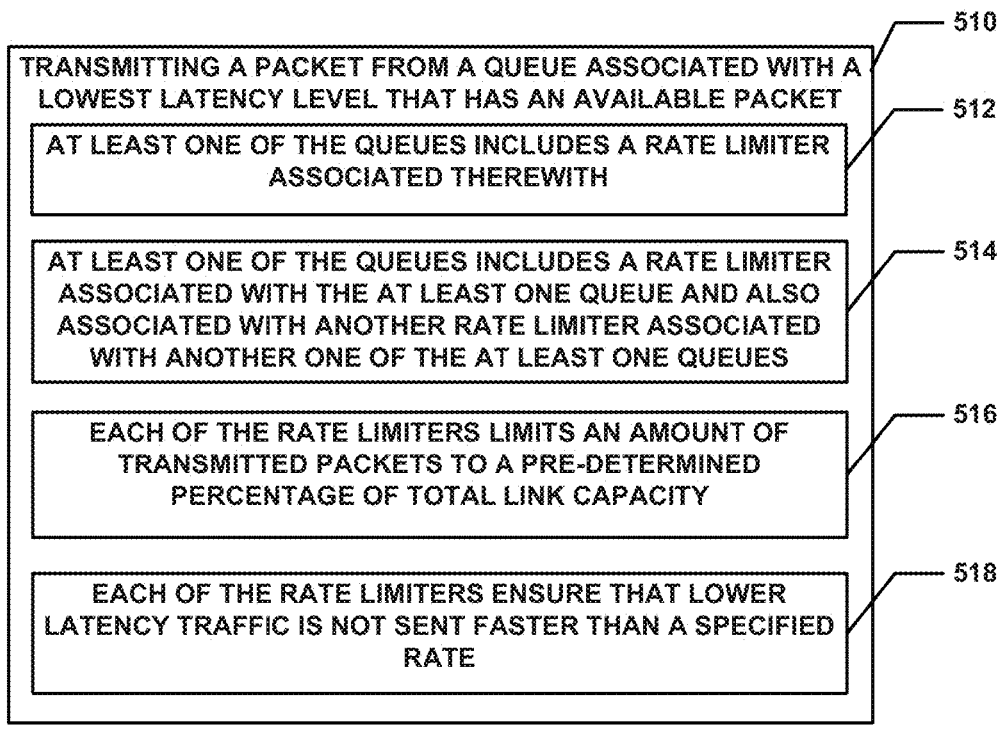

Referring now to FIGS. 15A and 15B a particular embodiment of a method 500 providing PDQoS with class-based latency differentiation is shown. Method 500 begins with processing block 502 which discloses classifying a packet into a class based on a traffic type associated with the packet. Processing block 504 states assigning a priority value to the packet wherein packets in a flow are assigned priorities according to some probability distribution within some band.

Processing block 506 recites determining, at a network device for a highest latency class, whether a sum of queued packet sizes of previously received packets having an equal or smaller latency class than the packet and larger or equal priority than the packet is larger than a threshold value for the latency class associated with the network device, and when sum of queued packet sizes of previously received packets having an equal or smaller latency class than the packet and larger or equal priority than the packet is larger than the threshold value, then dropping the packet, otherwise determining whether a latency class of the packet is less than the latency class of the network device and when the latency class of the packet is not less than the latency class of the network device then storing the packet in a queue for the latency class, and when the latency class of the packet is less than the latency class of the network device then repeating the determining for a next lower latency class until the packet is dropped or stored in a queue. As shown in processing block 508, in a particular embodiment this can include determining, at a network device for a highest latency class, whether a sum of queued packet sizes of previously received packets having an equal or smaller latency class than the packet and larger or equal priority of a predetermined plurality of priorities than the packet is larger than a threshold value for the latency class associated with the network device.

Processing continues with processing block 510 which discloses transmitting a packet from a queue associated with a lowest latency level that has an available packet. As shown in processing block 512 this can include wherein at least one of the queues includes a rate limiter associated therewith. As further shown in processing block 514, at least one of the queues includes a rate limiter associated with the at least one queue and also associated with another rate limiter associated with another one of the at least one queues. As stated in processing block 516, each of the rate limiters limits an amount of transmitted packets to a pre-determined percentage of total link capacity. As further stated in processing block 518, each of the rate limiters ensure that lower latency traffic is not sent faster than a specified rate.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), packet-switching device such as an IP or MPLS router or an Ethernet switch, or another device(s) capable of being integrated with a processor (s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method, comprising:
classifying a packet into a latency class based on a traffic type associated with said packet, wherein a network device has an associated latency class;
assigning a priority value to said packet, wherein packets in a flow are assigned priorities according to a specified probability distribution within a specified band;
determining, at said network device for a highest latency class, whether a sum of queued packet sizes of previously received packets having an equal or smaller latency class than said packet and a larger or equal priority than said packet is larger than a threshold value for the latency class associated with said network device, and when the sum of queued packet sizes of previously received packets having an equal or smaller latency class than said packet and a larger or equal priority than said packet is larger than said threshold value, then dropping said packet, otherwise determining whether the latency class of said packet is less than the latency class associated with said network device, and when the latency class of said packet is not less than the latency class associated with said network device, then storing said packet in a queue for the latency class of said packet, and when the latency class of said packet is less than the latency class associated with said network device, then repeating said determining for a next lower latency class until said packet is dropped or stored in a queue.

2. The method of claim 1 further comprising transmitting a packet from one of a plurality of queues that has an available packet, wherein said one of said plurality of queues is associated with a lowest latency level.

3. The method of claim 2 wherein at least one of said plurality of queues includes a rate limiter associated therewith.

4. The method of claim 2 wherein at least one of said plurality of queues includes a rate limiter associated therewith, and also associated with another rate limiter associated with another one of said plurality of queues.

5. The method of claim 4 wherein each rate limiter limits an amount of transmitted packets to a pre-determined percentage of total link capacity.

6. The method of claim 4 wherein each rate limiter ensures that lower latency traffic is not sent faster than a specified rate.

7. The method of claim 1 wherein said determining, at said network device for a highest latency class, whether a sum of queued packet sizes of previously received packets having an equal or smaller latency class than said packet and a larger or equal priority than said packet is larger than a threshold value for the latency class associated with said network device comprises determining, at said network device for the highest latency class, whether the sum of queued packet sizes of previously received packets having an equal or smaller latency class than said packet and a larger or equal priority of a predetermined plurality of priorities than said packet is larger than the threshold value for the latency class associated with said network device.

8. A non-transitory computer readable storage medium having computer readable code thereon for providing Precedence Drop Quality Of Service (PDQoS) with class-based latency differentiation, the medium including instructions in which a computer system performs operations comprising:
classifying a packet into a latency class based on a traffic type associated with said packet, wherein a network device has an associated latency class;
assigning a priority value to said packet, wherein packets in a flow are assigned priorities according to a specified probability distribution within a specified band;
determining, at said network device for a highest latency class, whether a sum of queued packet sizes of previously received packets having an equal or smaller latency class than said packet and a larger or equal priority than said packet is larger than a threshold value for the latency class associated with said network device, and when the sum of queued packet sizes of previously received packets having an equal or smaller latency class than said packet and a larger or equal priority than said packet is larger than said threshold value, then dropping said packet, otherwise determining whether the latency class of said packet is less than the latency class associated with said network device, and when the latency class of said packet is not less than the latency class associated with said network device, then storing said packet in a queue for the latency class of said packet, and when the latency class of said packet is less than the latency class associated with said network device, then repeating said determining for a next lower latency class until said packet is dropped or stored in a queue.

9. The computer readable storage medium of claim 8 further comprising transmitting a packet from one of a plurality of queues that has an available packet, wherein said one of said plurality of queues is associated with a lowest latency level.

10. The computer readable storage medium of claim 9 wherein at least one of said plurality of queues includes a rate limiter associated therewith.

11. The computer readable storage medium of claim 9 wherein at least one of said plurality of queues includes a rate limiter associated therewith, and also associated with another rate limiter associated with another one of said plurality of queues.

12. The computer readable storage medium of claim 11 wherein each rate limiter limits an amount of transmitted packets to a pre-determined percentage of total link capacity.

13. The computer readable storage medium of claim 11 wherein each rate limiter ensures that lower latency traffic is not sent faster than a specified rate.

14. The computer readable storage medium of claim 8 wherein said determining, at said network device for a highest latency class, whether a sum of queued packet sizes of previously received packets having an equal or smaller latency class than said packet and a larger or equal priority than said packet is larger than a threshold value for the latency class associated with said network device comprises determining, at said network device for the highest latency class, whether the sum of queued packet sizes of previously received packets having an equal or smaller latency class than said packet and a larger or equal priority of a predetermined plurality of priorities than said packet is larger than the threshold value for the latency class associated with said network device.

15. A computer system, comprising:
a memory;
a processor;
a communications interface;
an interconnection mechanism coupling the memory, the processor, and the communications interface; and
wherein the memory is encoded with an application providing Precedence Drop Quality Of Service (PDQoS) with class-based latency differentiation, that when performed on the processor, provides a process for processing information, the process causing the computer system to perform the operations of:
classifying a packet into a latency class based on a traffic type associated with said packet, wherein a network device has an associated latency class;
assigning a priority value to said packet, wherein packets in a flow are assigned priorities according to a specified probability distribution within a specified band;
determining, at said network device for a highest latency class, whether a sum of queued packet sizes of previously received packets having an equal or smaller latency class than said packet and a larger or equal priority than said packet is larger than a threshold value for the latency class associated with said network device, and when the sum of queued packet sizes of previously received packets having an equal or smaller latency class than said packet and a larger or equal priority than said packet is larger than said threshold value, then dropping said packet, otherwise determining whether the latency class of said packet is less than the latency class associated with said network device, and when the latency class of said packet is not less than the latency class associated with said network device, then storing said packet in a queue for the latency class of said packet, and when the latency class of said packet is less than the latency class associated with said network device, then repeating said determining for a next lower latency class until said packet is dropped or stored in a queue.

16. The method of claim 15 further comprising transmitting a packet from one of a plurality of queues that has an available packet, wherein said one of said plurality of queues is associated with a lowest latency level.

17. The method of claim 16 wherein at least one of said plurality of queues includes a rate limiter associated therewith.

18. The method of claim 16 wherein at least one of said plurality of queues includes a rate limiter associated therewith, and also associated with another rate limiter associated with another one of said plurality of queues.

19. The method of claim 18 wherein each rate limiter limits an amount of transmitted packets to a pre-determined percentage of total link capacity.

20. The method of claim 18 wherein each rate limiter ensures that lower latency traffic is not sent faster than a specified rate.

21. The method of claim 15 wherein said determining, at said network device for a highest latency class, whether a sum of queued packet sizes of previously received packets having an equal or smaller latency class than said packet and a larger or equal priority than said packet is larger than a threshold value for the latency class associated with said network device comprises determining, at said network device for said highest latency class, whether the sum of queued packet sizes of previously received packets having an equal or smaller latency class than said packet and a larger or equal priority of a predetermined plurality of priorities than said packet is larger than the threshold value for the latency class associated with said network device.

* * * * *